March 10, 1970 F. F. GRANT 3,500,432

INCREMENTAL RECORDER

Filed Dec. 5, 1966

INVENTOR:
Frederic F. Grant
By Warren T. Jessup
ATTORNEY 3,500,432
INCREMENTAL RECORDER Frederic F. Grant, Bellflower, Calif., assignor, by mesne assignments, to Astro-Science Corporation, South El Monte, Calif., a corporation of Texas Filed Dec. 5, 1966, Ser. No. 599,266
Int. Cl. G01d *15/06*
U.S. Cl. 346—74 2 Claims

ABSTRACT OF THE DISCLOSURE

A mechanism for recording binary data on a magnetic tape, or the like, is provided which is entirely mechanical in its nature. The mechanism includes a magnetic recording head with a permanent magnet rotatably mounted in the core. The permanent magnet is movable between two limiting positions to control the direction of magnetic flux across the recording gap of the head, so that binary data may be stored on the magnetic tape.

The present invention is concerned with magnetic recording, and it relates particularly to an improved and simplified mechanism for recording binary data on a magnetic tape, or equivalent magnetic recording medium.

In the embodiment to be described, the recording is achieved by manually actuated mechanical means, and without the need for record electronics. The particular type of manually operated magnetic recorder finds utility, for example, for record keeping as applied, for example, to inventory control, audits, sales records and so on.

The magnetic recorder of the invention normally produces "NRZ" type recording of digital data, as will become evident. However, it will also become evident that the invention is not limited to that type of recording, but can easily be adapted to "return to zero" type recording of digital data.

An object of the invention, therefore, is to provide an improved mechanism for recording digital data on a magnetic tape, or other recording medium.

A more specific object of the invention is to provide such an improved magnetic recording mechanism which is mechanical in nature, and which obviates the need for the usual record electronics in the recording apparatus.

Other objects and advantages of the invention will become apparent from a consideration of the following description, when the description is considered in conjunction with the accompanying drawing, in which.

Figure 1:
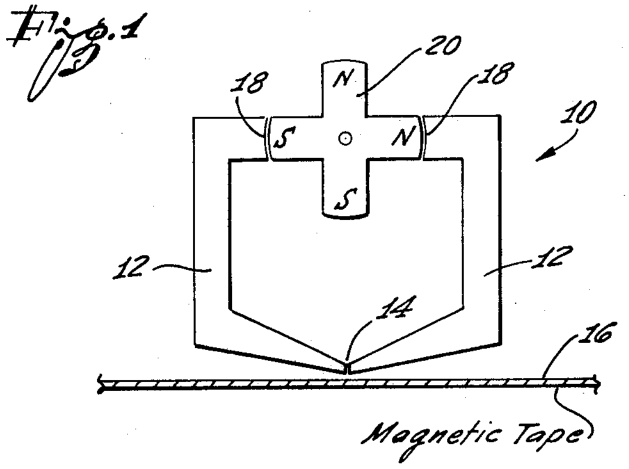
FIGURE 1 is a schematic representation of a magnetic recording head assembly constructed in accordance with the concepts of the invention so as to be capable of being incorporated into the recording mechanism of the invention.

The magnetic head assembly 10, shown schematically in FIGURE 1, includes a usual iron core 12 with a forward gap 14. A magnetic flux of a first or second polarity is established across the gap 14 in a manner to be described, so that corresponding recordings of one polarity or another may be recorded on a magnetic tape 16, as the tape is drawn across the gap 14.

The core also includes a back gap 18, and a "+" shaped permanent magnet 20 is rotatably mounted in the back gap. The permanent magnet member 20 exhibits magnetic poles, as shown. This is achieved by longitudinally magnetizing the two sections of the member 20.

It will be appreciated that when the magnet 20 has the angular position shown in FIGURE 1, a flux will be established in the core 12 in a particular direction, so as to establish a flux of a first polarity across the gap 14. However, when the permanent magnet 20 is turned through 90°, for example, a reverse polarity flux will be established in the core 12, and across the gap 14.

Therefore, the mechanical turning of the magnet 20 serves to reverse the flux across the gap 14, and thereby to reverse the polarity of the magnetic signal recorded on the portion of the surface of the magnetic tape 16 adjacent the gap 14 at that particular instant.

It will be appreciated, therefore, that if the tape 16 is advanced incrementally from one position to the next, and if the magnet 20 is mechanically controlled to have a first or second angular position for each such position of the tape, as determined by whether a binary "1" or a binary "0" is to be recorded at that particular portion of the tape, binary data may be magnetically recorded in "NRZ" manner on the tape in this manner.

It should be noted that because of the magnetic attraction between the poles of the permanent magnet 20 and the adjacent pole pieces of the magnetic core 12, the permanent magnet 20 is self-detenting in either of its angular positions. Therefore, any mechanical means which will cause it to "flip" from one angular position to the other will provide a suitable control for the magnet 20.

Figure 2:
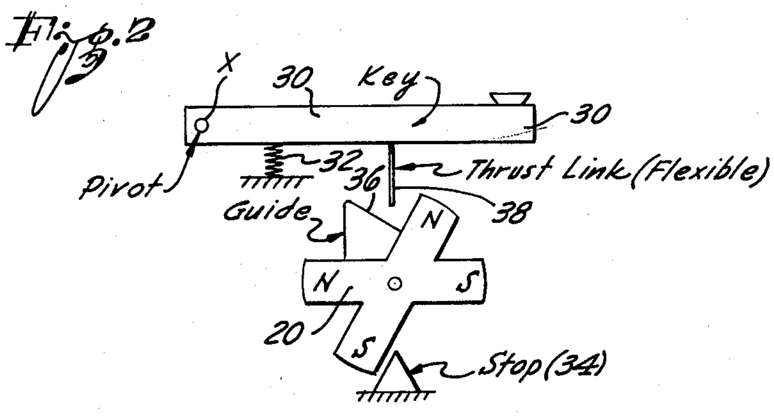
FIGURE 2 shows schematically a mechanism suitable for rotating a permanent magnetic portion of the head assembly of FIGURE 1 from one angular recording position to another.

One such mechanical control mechanism is shown in FIGURE 2; the illustrated control also including a suitable stop to prevent overtravel and mislocation of the permanent magnet 20.

The control mechanism of FIGURE 2 includes a manually operated key 30 which is pivotally mounted at X, and which is spring biased is a counterclockwise direction by a spring 32 to its unactuated "up" position.

The arms of the magnet 20 may be, for example, at 30° to one another, rather than 90°, as shown in FIGURE 1. A stop member 34 is provided to limit the angular movement of the permanent magnet.

A guide 36, in the form of an inverted V is mounted on the permanent magnet 20, as shown, and a depending flexible actuating link 38 is mounted on the key 30 and is positioned to engage one side of the guide or the other, as the key is actuated to a depressed position. This engagement of the flexible link 38 with one side of the guide 36 or the other, depends upon the angular position of the magnet 20, when the key 30 is depressed.

It will be understood that as the key 30 is actuated, the flexible link 38 moves down one side of the guide 36, or the other, and turns the magnet 20 to one of its angular positions or the other. When the magnet 20 is so turned, the magnetic attraction described above acts as a self-detenting means, so that the magnet is firmly held in position against the stop 34.

In the illustrated position of the magnet 20 in FIGURE 2, the actuation of the key 30 causes the magnet 20 to turn in a clockwise direction to its other angular position. It will be appreciated that when the magnet 20 is in its other angular position, the guide 36 is so located that the thrust link 38 is forced down its other side to turn the magnet 20 in the opposite counter-clockwise direction back to the position illustrated in FIGURE 2.

Therefore, each time the key 30 is depressed, the angular position of the magnet 20 is reversed and the magnetic polarity of the flux in the gap 14 is likewise reversed. Therefore, a desired magnetic recording can be reversed from "1" to "0" and vice versa, for usual "NRZ" recording, merely by depressing the key 30.

Figure 3:
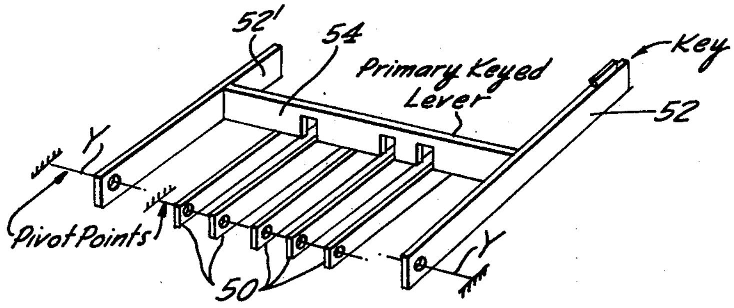
FIGURE 3 is a perspective schematic representation of a multiple mechanism whereby an alpha-numeric symbol may be recorded in a multiplicity of channels on a magnetic tape, in accordance with a multi-digit binary type code.

It will also be appreciated that by positioning a row of head assemblies, such as the assembly of FIGURE 1, as a head stack across the tape 16, so that the forward gap 14 of each head is magnetically coupled to a different channel on the tape, then the selective angular orientation of the different magnets 20 will result in a multichannel, multi-bit recording, in which the bits in the respective channels for each tape position may be coded in compliance with any selected code to represent different alpha-numeric characters An actuating mechanism for such a multi-channel head stack is shown in the perspective schematic view of FIGURE 3. As shown in FIGURE 3, each of the separate magnets 20 in the head stack is provided with a separate actuating key or lever 50. Each key 50 may be coupled to its corresponding magnet 20 in the manner described in conjunction with FIGURE 2.

Then, each alpha-numeric key, such as the key lever 52 in FIGURE 3, includes a further lever 52', the key levers 52 and 52' being mounted for angular movement about a pivotal axis Y—Y. The key 52 may be biased to its upper position, in the same manner as described in conjunction with the key 30 in FIGURE 2.

An actuating bar 54 extends across the keys 50 between the levers 52 and 52', and this bar is slotted, so that when the particular key 52 is depressed, selected ones only of the keys 50 are actuated.

If a plurality of keys 52 are provided, each operating a bar 54 with a different pattern of slots, it will be appreciated that a multi-channel binary recording may be achieved in IBM, binary coded, or any other format, in correspondence with the different alpha-numeric symbols represented by the different keys.

FIGURE 3 shows, for example, five actuating keys 50 for five-channel recording. The actuating bar 54 actuates the keys 50 selectively so that the alpha-numeric character corresponding to the particular key 52 is recorded on the tape, in binary coded form, as described above.

As noted, there will be a key lever 52 for each alphanumeric character and each will control an actuating bar 54, slotted in a selected manner, so that a selected pattern of keys 50, corresponding to the particular 52, will be actuated.

By means of linkage and ratchet arrangement, the tape driving capstan may be advanced, for example, 0.005 inch each time any alpha-numeric key 52 is depressed.

The mechanism described above is one in which any alpha-numeric key may be depressed to cause a record head stack to establish magnetic fluxes in various channels on a magnetic tape in correspondence with the alphanumeric symbol represented by that key.

The invention provides, therefore, a simple and inexpensive mechanical recording means, whereby digital information may be recorded on a magnetic medium.

While a particular embodiment of the invention has been described, modifications may be made.

What is claimed is:

1. A mechanism for recording binary data on a magnetic recording medium including:

a magnetic recording head having a magnetic core structure with a first gap and a second gap;

a magnetic member in the form of an X-shaped permanent magnet composed of first and second longitudinally magnetized permanent magnet sections rotatably mounted in said second gap to present opposite magnetic poles to said core structure as said magnetic member is moved between first and second angular positions so as to control the direction of magnetic flux across said first gap; and actuating means coupled to said magnetic member for angularly moving said magnetic member between said first and second angular positions.

2. Apparatus for recording binary data in a plurality of channels on a magnetic tape, said apparatus including:

a magnetic recording head stack including a plurality of magnetic core structures each with a first gap and a second gap;

a corresponding plurality of magnetic members rotatably mounted in said second gap and each having a configuration and magnetic polarity to present opposite magnetic poles to said core structure when respective ones of said magnetic members are moved between first and second angular positions so as to control the direction of magnetic flux across corresponding ones of said first gaps; and actuating means coupled to said magnetic members for selectively angularly moving said magnetic members between said first and second angular positions, said actuating means including a plurality of pivotally mounted levers mechanically coupled to respective ones of said magnetic members, and a common key mechanically coupled to said levers, so as to actuate selected ones of said levers as said key is operated.

References Cited

UNITED STATES PATENTS 3,218,398 11/1965 Wiley ............ 179—100.2

3,351,717 11/1967 Metz ............. 179—100.2

BERNARD KONICK, Primary Examiner

G. M. HOFFMAN, Assistant Examiner

U.S. Cl. X.R.

179—100.2